April 27, 1943.     G. P. HOFF     2,317,911
RUBBER STRUCTURE
Original Filed Nov. 1, 1938

INVENTOR.
George Preston Hoff
BY
ATTORNEY

Patented Apr. 27, 1943

2,317,911

UNITED STATES PATENT OFFICE 2,317,911

RUBBER STRUCTURE

George Preston Hoff, Wilmington, Del., assignor to E. I. du Pont de Nemours & Company, Wilmington, Del., a corporation of Delaware Original application November 1, 1938, Serial No. 238,210. Divided and this application June 25, 1941, Serial No. 399,596

3 Claims. (Cl. 152—359)

This invention relates to improved reinforcing elements for reinforced rubber articles such as pneumatic tires, belting, hose, and the like with the resultant production of greatly improved reinforced rubber articles. More particularly, this invention relates to the construction of reinforcing elements for rubber articles from a new class of synthetic filaments, and to the improved construction of such rubber articles with such reinforcing elements. For convenience, this invention will be described in terms of pneumatic tires although it is to be understood that it is not so limited.

This is a division of my copending application Serial No. 238,210, filed November 1, 1938, which matured into Patent 2,273,200, Feb. 17, 1942.

Early in the manufacture of pneumatic tires, it became apparent that some reinforcement was necessary since the rubber structures were unable to withstand the rapid and repeated flexing, sudden blows, centrifugal forces, etc., to which they were subjected. Early reinforcements comprised ordinary square woven fabrics such as duck embedded in the rubber mass. While such reinforced structures were an improvement, they were not very elastic. Good penetration of the fabric and adequate bonding of it to the rubber structure could not be obtained. Further, the abrasive action at the thread crossings was quite severe, contributing to the development of heat and the consequently rapid deterioration of the threads. As a result the tires failed either because of the disintegration of the reinforcing fabric or because of the separation of the fabric from the rubber. These structures have now been almost completely superseded by cords, either in the form of weftless fabrics or with light-filling threads.

Materials which have been tried for use in tire cords fall into three general classes: (a) cellulosic fibers and filaments, (b) protein fibers and filaments, and (c) metal wires. In class (a) belong cotton, linen, jute, and regenerated cellulose rayon while in class (b) belong silk and wool.

Of the cellulosic fibers and filaments, the use of linen and jute, despite their high strength, has not been successful since they are brittle so that cords prepared comprising them are deficient in flexing and fatigue characteristics. The use of cotton, on the other hand, has been quite successful although it is only moderately strong and only fairly resistant to heat and the action of common chemicals. While cotton is deficient in elastic properties, mechanical elasticity can be built into the cord by imparting to the elements thereof a high twist. The introduction of this twist, however, tends to reduce the flexibility of the cord and with very high degrees of twist the actual strength of the cord may be reduced. Similarly, the introduction of a high twist decreased the penetration of the rubber and/or adhesive into the cord, increasing the difficulties of adhesion to the rubber. As a result, the abrasive action and heat produced upon flexing and stretching is increased.

More recently certain types of high tenacity regenerated cellulose rayon have been used in the production of tire cords. This use has resulted in more satisfactory tires since the rayon has a higher tensile strength than the cotton and is not so sensitive to heat. Likewise, since it is a continuous filament, the twist can be reduced below that required for cotton and the impairment of the strength by the high twist introduced eliminated. The natural elasticity of the rayon is, however, like cotton, insufficient for the requirements of a tire cord so it is necessary to introduce mechanical elasticity by twisting. This necessary twist is sufficiently high to reduce to some extent the flexibility of the cord and if the twist is very high there will be an impairment to the strength of the cord.

Of the protein fibers and filaments which have been tried for the manufacture of tire cords, silk while strong and fairly elastic has not been satisfactory because of its poor resistance to the effects of heat and to common chemicals such as acids, alkalis, etc., and its deterioration with time. Cords produced from silk are thus damaged during the fabrication of the tire and their strength is reduced materially at the high temperatures encountered in the use of a tire. Similarly, the use of wool has not been successful largely because of its low strength. Cords produced from it have been deficient in strength, although they have adequate elasticity under small loads and they have good resistance to heat and chemical action.

Metal wires and braided structures (cords) made therefrom have excellent strength at all tire temperatures. They are, however, stiff and are deficient in flexing characteristics and in elasticity. While many metals have excellent elasticity over a narrow range, this is not sufficient for use in a tire cord, since a tire cord must flex and stretch with the rubber. Although some mechanical elasticity can be built into a cord by twisting or coiling, this is limited, especially since the fatigue characteristics of metal wire are poor, causing early failure. In addition to these things, the problem of adhesion of the metal to the rubber base has been a difficult one.

It is evident, therefore, that the exacting requirements of a material satisfactory for tire cord have up to this time narrowed the field of useful materials to those of a cellulosic nature. Furthermore, of these cellulosic materials only two have been successful, cotton and high tenacity regenerated cellulose rayon, while the others, such as linen and jute, have not been satisfactory.

The utility of cotton and high tenacity regenerated cellulose as reinforcing elements for reinforced rubber articles is dependent, among other characteristics, upon their low elongation, heat insensitivity, inertness to the chemicals used in the construction of the rubber articles, fatigue resistance (ability to withstand rapid and continued stretching and flexing), and ability to be bonded to the rubber.

The necessity for these various properties, singly or in combination, is well known to those skilled in the art and is easily understood when it is realized that to be truly successful the cord must be an integral part of the tire and so it must stretch and flex with the rubber and it must retain these properties during the life of the tire and not be unduly affected by heat, fatigue, common chemicals, etc. That the cords have a high resistance to deformation and a low elongation is important in order that the cord does not become permanently deformed, e. g., elongated, which results in deformation of the tire and permanent enlargement sometimes referred to as "tire growth." Tire cords may become permanently deformed in two ways: first, by stresses which cause strains exceeding the elastic limit, and/or second, by stresses applied continuously over a long period of time even though their magnitude is insufficient to cause strains exceeding the elastic limit. This latter phenomenon is sometimes referred to as "plastic flow."

There has recently been produced a new type of synthetic filaments and yarns which comprises synthetic linear polyamides. Fiber-forming synthetic linear polyamides and filaments produced therefrom are described in U. S. Patents Nos. 2,071,250 and 2,071,253. These synthetic linear polyamides are of two types, those obtainable from monoaminomonocarboxylic acids or related compounds, and those obtainable from the reaction of suitable diamines and dibasic carboxylic acids. These synthetic polyamides may be prepared, for example, by a process of condensation polymerization, although their preparation is not so limited. The diamine-dibasic acid polymers are described in greater detail in the U. S. Patent No. 2,130,948. Of these synthetic polyamides, polyhexamethylene adipamide which may be prepared, for example, by the condensation polymerization of hexamethylene diamine and adipic acid is particularly valuable. For convenience of discussion, these synthetic linear polyamides will hereinafter be referred to as polyamides, and specific reference shall be made to polyhexamethylene adipamide, although it is understood that the invention is not so limited.

Many of the properties of cotton and regenerated cellulose which were considered essential to their use as reinforcing elements in reinforced rubber articles either were entirely lacking, or appeared to be lacking, in these synthetic polyamide yarns. Many of the properties of synthetic polyamide yarns resemble closely the properties of protein filaments such as silk and wool. This is to be expected since their chemical structure, i. e., amide linkages, is very similar to those of proteins. Because of this similarity, it has been possible to replace silk and wool by those polyamide filaments very successfully for many uses. This same similarity has, however, militated against their consideration for use in tire cords since protein type filaments are unsatisfactory for the reasons above outlined.

Other properties of these polyamide yarns include their crystalline character, their definite melting point (about 265° C.), and their capability of being spun directly from the molten material. In their crystalline character, these polyamides resemble metals which are not suitable for tire cords. For this reason, it might be expected that the polyamide yarns would be deficient in resistance to fatigue as are metal wires.

As spun, these polyamide filaments exhibit an extremely high elongation, in the order of 400–500%. They may be cold drawn (stretched in the solid state) whereupon they exhibit orientation along their axes and their elongation is reduced, although even then under ordinary conditions, it is still as high as approximately 20% which has heretofore been considered far too high for reinforcing elements for rubber articles such as tires, belts and the like. The elongation at elevated temperatures is somewhat higher.

Although oriented polyamide yarns have some properties which are greatly desired in reinforcing elements for rubber products, the similarity of their properties to protein materials on the one hand and to metal wires on the other, their high elongation, and their temperature sensitivity have discouraged their consideration for use in tire cords. Likewise, the fact that the filaments are not appreciably sensitive to water or organic solvents was considered to be undesirable since it greatly complicates the problem of adhesion to the rubber. Similarly, the remarkable smoothness and slickness present a serious problem in obtaining the essential adhesion of the yarn to the rubber. By the term "smoothness" is meant the absence of crenulations and the like from the surface of the filaments and by "slickness" reference is made to the coefficient of friction of the yarn.

Contrary to expectations it has now been found that reinforced rubber articles, which are subjected in use to severe flexing and stretching such as tires, belting, hose and the like, with very remarkable properties, can be prepared by the use of filaments of these synthetic linear polyamides. This can be accomplished particularly by employing new and novel constructions which take advantage of some of the remarkable and desirable properties of these filaments such as their high strength and elasticity, and substantially eliminate the undesirable effects of their less desirable properties such as their high elongation, and temperature sensitivity.

It is, therefore, an object of this invention to produce new and useful reinforcing elements for reinforced rubber articles, and to produce greatly improved reinforced rubber articles such as tires, belting, hose and the like comprising filaments of synthetic linear condensation polymers.

Other objects of this invention will appear hereinafter.

In order to more clearly set forth the structure of reinforced rubber articles in accordance with this invention, reference is made to the accompanying illustration in which.

Figure 1:
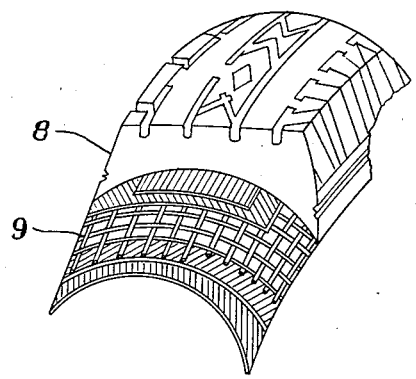
Figure 1 is a perspective view of a tire carcass containing a conventional tire fabric constructed of an improved reinforcing material.
Figure 2:
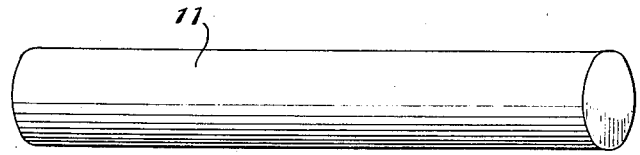
Figure 2 is a greatly magnified perspective view of a single filament suitable for use as a rubber reinforcing element.

Referring to the drawing, reference numeral 8 designates a tire carcass containing embedded therein a reinforcing fabric 9. The reinforcing fabric is constructed of a single large filament 11, generally referred to as a mono-fil as shown in Figure 2.

The oriented synthetic polyamide filaments, used for textile purposes and suitable for this invention, usually have an elongation lying approximately between 15% and 50%. This is higher than that permissible in filaments or fibers previously used in tire cords since cords produced from the high elongation synthetic polyamides in the conventional manner, by the necessary twisting together of the filaments and yarns, would have an excessive elongation rendering them of little use in tires. It has now been found, however, that tire cords, i. e., the reinforcing structures used in tires, can be prepared from these synthetic polyamide filaments, which cords do not have an excessive elongation and it has also been found that in spite of the heat sensitivity of these synthetic polyamide filaments new and novel tires can be made comprising these cords, which tires have remarkable strength under all conditions of use.

Because of the remarkable elasticity of the polyamide filaments, it is not necessary to introduce mechanical elasticity so that cords with little or no twist may be used, and because of their great strength it is possible to use cords of much smaller denier thus enabling the manufacture of much lighter tires with thinner walls and fewer, or thinner, plies of reinforcing cords. Since the rate of heat transfer is a function of wall thickness the heat produced in operation is much more readily dissipated.

This is the first time that it has been possible to use a tire cord with little or no twist since with all previously known filaments and fibers it has been necessary to introduce a substantial degree of twist. That these polyamide yarns have an exceedingly high elasticity is shown by Table I.

The data in Table I were determined in the following manner. Known lengths of each yarn were placed between two jaws of a testing machine and stretched the indicated amounts and then released while held at a temperature of 70° F. and a relative humidity of 60%. This cycle was repeated five times within a period of two minutes. The released length of the yarn was then measured. The percentage elastic recovery was calculated by the following formula:

$$\frac{\text{Stretched length} - \text{released length}}{\text{Stretched length} - \text{original length}} \times 100 =$$

Each value in the table is an average value for several determinations.

Table I

| | Per cent elastic recovery after stretches of— | | | | |
|---|---|---|---|---|---|
| | 3% | 6% | 9% | 12% | 15% |
| Conventional viscose rayon | 50.7 | 35.0 | 24.4 | 21.6 | 16.6 |
| High tenacity viscose rayon | 50.7 | 40.0 | 36.6 | 32.6 | Broke |
| Polyhexamethylene adipamide | 100.0 | 100.0 | 93.5 | 88.7 | 82.6 |

This remarkable inherent elasticity of the polyamide filaments permits the preparation of tire cords with little or no twist; hence, additional elongation is not introduced and the resultant cords have substantially the same elongation as their component filaments. All previously known tire cords have had a substantially greater elongation than the filaments or fibers comprising them since it has been necessary to introduce mechanical elasticity by twisting, and twisting must necessarily introduce additional elongation.

Likewise, because of the remarkable strength of these polyamide filaments, it is possible to use cords of much smaller denier with the same strength as previously known cords, or to use cords of the same denier but of much greater strength. Because of this property of the polyamide filaments, it is possible to construct a much thinner tire and one which is much lighter in weight than was possible with previously known materials. As a result of this and the reduction in twist and increase in flexibility, the tires so produced never reach the high temperatures experienced with previously known tires. In the first place, because of the remarkable elasticity and flexibility of the cords, their low resistance to deformation and thinness of the tire, very little energy is required to flex it so that little heat is produced, and in the second place, due to the thinness of the side walls and tread of the tire, the heat produced is readily dissipated. As a result, the effect of high temperature never becomes a problem despite the heat sensitivity of the polyamide filaments.

It has been found that the wear on the tread of the tire is proportional to the temperature which is developed in the tire during the use thereof. Therefore, when a tire develops a lower temperature it can be made with a thinner tread to obtain a tire which will give the same amount of wear.

Heretofore, in the construction of reinforced rubber articles such as tires with cotton or high tenacity regenerated cellulose cords, it was necessary to build up the tire carcass with plies of such cords to such total thicknesses that the tires in normal operation developed temperatures in excess of 250° F. By the use of reinforcing cords composed of mono-fils of oriented synthetic linear polyamides, the thickness of the cords can be reduced, or the number of plies can be reduced, to a point where the temperatures developed in the tires during their use will never exceed 250° F. It has been found, by actual measurement with thermocouples positioned in the tires during their use, that the temperatures developed in tires are a direct function of the thickness of the tires.

*Example I*

A 6-ply pneumatic tire was produced in the usual manner using for the reinforcing plies a weftless fabric comprising 1800-denier, 1800-filament, 3-turns per inch S twist, oriented polyhexamethylene adipamide cord having an elongation of 18%. This 1800-denier cord had a tensile strength comparable to a high tenacity regenerated cellulose rayon cord of approximately 3300 denier. As a result of this decrease in size of the cord, the individual plies were much thinner than those prepared from previously known filaments but had substantially the same strength; consequently, the tire produced was much thinner and lighter. This reduction in weight decreased the centrifugal force to which the tire was subjected. This tire, if subjected to actual use under severe conditions, will not develop a temperature in excess of 250° F.

Example II

A tire was produced as in Example I using a 300-denier, 1500-filament, 1-turn per inch S twist, oriented polyhexamethylene adipamide yarn of 20% elongation as the cord element. The twist was introduced merely to facilitate the handling of the yarn during its incorporation in the tire. Due to the great strength of the yarn fewer plies were required than for previously known filaments. The tire produced had excellent strength and wearing properties and was much lighter and more flexible than similar size tires produced prior to this invention. Very little heat was developed when this tire was used.

Example III

A tire was produced in the usual manner using as the reinforcing cord a 2400-denier, 240-filament, zero twist yarn having an elongation of 20%. Due to the absence of twist when this yarn was introduced into the tire fabric, the filaments spread out into a flat, ribbon-like bundle. This facilitated penetration of the rubber into the fabric during the calendering operation assisting in the bonding of the filament to the rubber.

Due to the remarkable flexibility and elasticity of these filaments, comparatively large filaments can be used, and it is a matter of no importance whether or not all the filaments become intimately associated with the rubber. As a matter of fact, in the interest of producing an integral structure wherein the rubber and the filaments truly cooperate, it is preferred that the rubber mass become bonded to as many of the filaments as possible. It is, in fact, possible to use, as the reinforcing elements for tires and the like, fabrics constructed of individual separated exceedingly large filaments, called monofils, instead of multi-filament cords.

Although these polyamide filaments are very smooth and slick and not easily wetted by water or organic solvents, by a suitable choice of adhesives, adequate adhesion of the polyamide yarns to the rubber has been obtained. The discussion of these adhesives is not within the scope of this invention.

While in the examples set forth above it has been shown how, by a practice of the invention, it is possible to produce tires of remarkable properties using as the tire cords oriented synthetic polyamide yarns having an elongation of about 20%, the invention is not so limited. Obviously, synthetic polyamide yarns having a lower elongation could be used in a similar manner since the advantages of the invention depend on the adaptation of the remarkable strength and elasticity of these polyamide yarns to the production of tires. It is possible to obtain yarns having elongation less than 20%, for example, an elongation varying from 10 to 20% by proper control of the drawing process. It is apparent, however, that it will generally not be preferred to use this polyamide yarn of low elongation because it is relatively more expensive to produce and it offers little or no advantages over the yarn of the higher elongation. As a matter of fact, due to the marvelous elastic recovery of these polyamide yarns over wide limits, the high elongation is an advantage since it contributes to the operating efficiency of the tire produced and does not result in permanent deformation as would be expected from a tire produced using other materials having a comparable elongation especially in view of the low resistance to deformation (within their elastic limits) of these synthetic polyamide filaments.

That the permanent deformation which these synthetic polyamides undergo, when stretched various amounts, is less than that of other materials is evidenced by Table II in which samples were tested in the same manner as described for Table I. The percentage of permanent deformation was calculated by the following formula:

$$\frac{\text{Released length} - \text{original length}}{\text{Original length}} \times 100 =$$

Table II

|  | Per cent permanent deformation after stretches of— | | | | |
| --- | --- | --- | --- | --- | --- |
|  | 3% | 6% | 9% | 12% | 15% |
| Conventional viscose rayon | 1.5 | 4.0 | 6.6 | 9.2 | 12.5 |
| High tenacity viscose rayon | 1.5 | 3.6 | 5.9 | 8.1 | Broke |
| Polyhexamethylene adipamide | 0.0 | 0.0 | 0.6 | 1.4 | 2.6 |

This high resistance to permanent deformation, the wide elastic limits of these polyamide yarns, and their tendency to show a very low "plastic flow" make it possible to produce rubber tires and like products according to the invention which show remarkably small tire growth.

While the invention has been described in terms of filaments and yarn prepared from polyhexamethylene adipamide, a synthetic linear polyamide, it is not so limited. It is to be understood that filaments prepared from other synthetic linear polymers are also useful in the invention. These synthetic linear polymers include besides the polyamides, the polyesters, polyethers, polyacetals, mixed polyester-polyamides, etc., which, for example, may be prepared by a process of condensation polymerization as described in U. S. Patent No. 2,071,250.

By the practice of the invention it is possible to produce tires of remarkable strength and durability. Because of the great strength and good bending and tensile elasticity of these synthetic polyamide filaments, it is possible to use cords of much lower denier and having little or no twist. Because of this reduction in denier, it is possible to make much lighter and thinner tires, having the same number of plies as previously known tires. Similarly, if cords of the same denier are used, lighter and thinner tires, having the same strength as previously known tires, can be produced by reason of fewer plies. This reduction in thickness and weight of the tire not only reduces the centrifugal forces to which it is subjected and reduces the cost of construction, but it also decreases the heat produced upon the flexing of the tire and in turn increases the rate of dissipation of the heat. It is thus possible to use the filaments with a high elongation commonly used for textile purposes since additional elongation is not introduced into the cord by twisting to obtain mechanical elasticity, cabling, etc. This is the first time that this has been possible, since previously known filaments and fibers have not had the necessary elastic properties. The elimination of a high twist results in more flexible cords and likewise more flexible tires comprising such cords. Because of this increased flexibility and high elasticity much less heat is produced upon flexing. As a result of this reduction in the heat produced by the thinner tires and the more rapid dissipation of this heat as above described, tires produced according to this invention never reach the high temperature reached in use by previously known tires, so that the heat sensitivity of these synthetic polyamide filaments never results in a serious impairment of the strength of the tires. Similarly, this reduction in twist results in a saving because the usual twisting, plying, cabling and other similar operations may be eliminated and the yarn or filaments may be incorporated in the tire directly from the package received from the manufacturer of the yarn or cord. The reduction in twist also is helpful in obtaining an integral structure since the rubber penetrates the yarn and tends to become intimately associated with each filament thus resulting in good bonding.

While this invention has been described with particular reference to the use of these synthetic linear polymers as the reinforcing members in tires, i. e., tire cords, it is apparent that these filaments are also useful in the preparation of other reinforced rubber articles such as hose, belting and the like. These filaments are particularly valuable in the manufacture of steam hose because of their remarkable strength and flexing characteristics.

By "low twist" as used throughout the specification is meant a twist not greater than four turns per inch even for a low denier yarn where this twist gives an exceedingly low helix angle.

By "high elasticity" is meant an elastic recovery of at least 50% from a stretch of at least 8%.

Since it is obvious that many changes and modifications can be made in the details above described without departing from the nature and spirit of the invention, it is to be understood that the invention is not to be limited except as set forth in the appended claims.

I claim:

1. Rubber tires containing, as the reinforcing element therein, a reinforcing structure consisting of an oriented synthetic linear polyamide mono-fil.

2. Rubber tires containing, as the reinforcing element therein, a fabric constructed with oriented synthetic linear polyamide mono-fils.

3. Rubber tires containing, as the reinforcing element therein, a reinforcing structure consisting of an oriented synthetic linear polyamide mono-fil having an elongation of approximately 15% to 50%.

GEORGE PRESTON HOFF.

CERTIFICATE OF CORRECTION.

Patent No. 2,317,911. April 27, 1943.

GEORGE PRESTON HOFF.

It is hereby certified that error appears in the printed specification of the above numbered patent requiring correction as follows: Page 4, first column, line 7, Example 2, for "300-denier" read --3000-denier--; and that the said Letters Patent should be read with this correction therein that the same may conform to the record of the case in the Patent Office.

Signed and sealed this 29th day of June, A. D. 1943.

(Seal)

Henry Van Arsdale,
Acting Commissioner of Patents.